United States Patent
Usa et al.

(10) Patent No.: US 10,189,937 B2
(45) Date of Patent: Jan. 29, 2019

(54) FINE POWDER-COATED AMINE AND COMPOSITION CONTAINING SAME

(71) Applicant: Sunstar Engineering Inc., Takatsuki-shi, Osaka (JP)

(72) Inventors: Nozomi Usa, Takatsuki (JP); Tatsuya Okuno, Takatsuki (JP)

(73) Assignee: SUNSTAR ENGINEERING INC., Osaka (JP)

( * ) Notice: Subject to any disclaimer, the term of this patent is extended or adjusted under 35 U.S.C. 154(b) by 0 days.

(21) Appl. No.: 15/542,775

(22) PCT Filed: Mar. 29, 2016

(86) PCT No.: PCT/JP2016/060104
§ 371 (c)(1),
(2) Date: Jul. 11, 2017

(87) PCT Pub. No.: WO2017/077722
PCT Pub. Date: May 11, 2017

(65) Prior Publication Data
US 2018/0237575 A1  Aug. 23, 2018

(30) Foreign Application Priority Data

Nov. 5, 2015  (JP) ................. 2015-217842

(51) Int. Cl.
| C08G 18/16 | (2006.01) |
| C08G 18/22 | (2006.01) |
| C08G 18/48 | (2006.01) |
| C08G 18/76 | (2006.01) |
| C08G 18/10 | (2006.01) |

(52) U.S. Cl.
CPC .......... *C08G 18/168* (2013.01); *C08G 18/10* (2013.01); *C08G 18/222* (2013.01); *C08G 18/4825* (2013.01); *C08G 18/7671* (2013.01)

(58) Field of Classification Search
USPC ........................................... 528/49
See application file for complete search history.

(56) References Cited

U.S. PATENT DOCUMENTS

| 5,866,668 A | 2/1999 | Maeda et al. |
| 6,660,943 B1 | 12/2003 | Gotoh et al. |
| 2006/0134398 A1 | 6/2006 | Nakamura et al. |
| 2012/0041088 A1 | 2/2012 | Ishida et al. |

FOREIGN PATENT DOCUMENTS

| EP | 0757067 A1 | 2/1997 |
| JP | 2002/302600 | 10/2002 |
| JP | 2003/342340 | 12/2003 |
| JP | 3769421 | 4/2006 |
| JP | 2006/169437 | 6/2006 |
| JP | 2011/26391 | 2/2011 |
| JP | 2013/72016 | 4/2013 |
| WO | 1995/026374 | 10/1995 |

OTHER PUBLICATIONS

International Search Report dated Jun. 21, 2016, from related Application No. PCT/JP2016/06014, 2 pages.
Extended European Search Report dated Aug. 11, 2017 from European Application No. 16775447.2, 7 pages.
International Preliminary Report on Patentability dated May 17, 2018, from related Application PCT/JP2016/060104 (6 pages).

*Primary Examiner* — Terressa Boykin
(74) *Attorney, Agent, or Firm* — Meunier Carlin & Curfman LLC

(57) ABSTRACT

This invention relates to a fine powder-coated amine comprising a solid amine having a melting point equal to or higher than 50° C. and a mean particle size equal to or smaller than 20 μm. The fine powder-coated amine has an amount of heat in the second absorption peak measured by a differential scanning calorimeter equal to or less than 220 J/g, and the surface of the solid amine is coated with fine powder having a mean particle size equal to or smaller than 2 μm.

7 Claims, No Drawings

US 10,189,937 B2

FINE POWDER-COATED AMINE AND COMPOSITION CONTAINING SAME

FIELD OF THE INVENTION

The present application claims the Paris Convention priority based on Japanese Patent Application No. 2015-217842 filed on Nov. 5, 2015, the entire content of which is incorporated herein by reference.

This invention relates to a fine powder-coated amine and a one-pack type heat curable composition containing the fine powder-coated amine as a hardener component.

BACKGROUND ART

In the past, a fine particles-coated amine prepared by coating the surface of a solid amine compound with fine particles and a surface-treated solid amine compound prepared by inactivating the surface of the solid amine compound with a sulfonamide-based derivative are used as a hardener component of a one-pack type heat curable composition (patent documents 1-3).

Patent Document 1: JP-B-3769421
Patent Document 2: JP-B-4423802
Patent Document 3: JP-A-2002-302600

SUMMARY OF THE INVENTION

However, it is found that a one-pack type heat curable composition in which the fine particles-coated amine or the surface-treated solid amine compound described in the above-mentioned patent documents 1-3 is used cannot fully harden at a comparatively low temperature and that the desired breaking strength cannot be obtained.

This invention relates to a one-pack type heat curable composition containing a fine particles-coated amine as a hardener component which exhibits good hardening properties and physical properties, in particular, breaking strength even when the one-pack type heat curable composition is hardened at a comparatively low temperature.

The inventors have made intensive studies based on the fact that the temperature at which a fine particles-coated amine is activated varies depending on the condition or the environment in the production of a fine particles-coated amine. As a result, the inventors have found that the above-mentioned object of the invention is achieved by a fine particles-coated amine containing a solid amine having a melting point equal to or higher than 50° C. and a mean particle size equal to or smaller than 20 μm, the fine particles-coated amine has an amount of heat in the second absorption peak measured by a differential scanning calorimeter equal to or less than 220 J/g and the surface of the soled amine is coated with fine particles having a mean particle size equal to or smaller than 2 μm, as well as a one-pack type heat curable composition containing the fine particles-coated amine.

The present invention is intended to provide the following embodiments.

[1] A fine particles-coated amine comprising a solid amine having a melting point equal to or higher than 50° C. and a mean particle size equal to or smaller than 20 μm, wherein the fine particles-coated amine has an amount of heat in the second absorption peak measured by a differential scanning calorimeter equal to or less than 220 J/g, and the surface of the solid amine is coated with fine particles having a mean particle size equal to or smaller than 2 μm.

[2] The fine particles-coated amine according to [1], wherein the solid amine is an aromatic or aliphatic amine compound.

[3] The fine particles-coated amine according to [1] or [2], wherein the solid amine has a mean particle size of 1 μm to 20 μm.

[4] The fine particles-coated amine according to any one of [1] to [3], wherein a weight ratio of the solid amines to the fine particles is 1/0.001 to 1/0.5.

[5] The fine particles-coated amine according to any one of [1] to [4], wherein the fine particles are at least one selected from the group consisting of a polyvinyl chloride, titanium oxide, calcium carbonate, clay, carbon, alumina, talc, zinc oxide and silica.

[6] A one-pack type heat curable composition comprising the fine particles-coated amine according to any one of [1] to [5].

[7] The one-pack type heat curable composition according to [6], comprising an isocyanate component.

Effects of the Invention

A one-pack type heat curable composition containing a fine particles-coated amine as a hardener component of the invention may exhibit good hardening properties and physical properties, in particular, good breaking strength even when the one-pack type heat curable composition is hardened at a comparatively low temperature, e.g., 100° C. In addition, a fine particles-coated amine of the invention sufficiently has activity as a hardener component of a one-pack type heat curable composition even when the mean particle size of a solid amine is comparatively small, e.g., 20 μm or smaller. Accordingly, in a one-pack type heat curable composition, it becomes possible to use a fine particles-coated amine which is finely divided.

EMBODIMENTS OF THE INVENTION

In the fine particles-coated amine of the invention, the surface of a solid amine having a melting point equal to or higher than 50° C. and a mean particle size equal to or smaller than 20 μm is coated with fine particles having a mean particle size equal to or smaller than 2 μm. In addition, the amount of heat in the second absorption peak measured by a differential scanning calorimeter is equal to or less than 220 J/g. Hereinafter, the amount of heat in the second absorption peak measured by a differential scanning calorimeter will be also referred to as the second absorption peak heat amount.

In the invention, the second absorption peak heat amount is an endoergic amount in a heat-absorption peak which is measured after the first heat-absorptive peak (melting point) measured by a differential scanning calorimeter when a fine particles-coated amine is heated. It is understood that the second absorption peak heat amount results from the amino group carbonated by a reaction of the following formula:

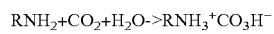

$$RNH_2 + CO_2 + H_2O \rightarrow RNH_3^+ CO_3H^-$$

When the second absorption peak heat amount is low, a fine particles-coated amine contains many active amino groups ($NH_2$) which are not carbonated and has high activity as a hardener. Therefore, the second absorption peak heat amount of a fine particles-coated amine of the invention is equal to or less than 220 J/g, preferably equal to or less than 200 J/g, more preferably equal to or less than 150 J/g. The lower limit of the second absorption peak heat amount is not particularly limited but, for example, equal to or more than 0 J/g. When the second absorption peak heat amount is more than 220 J/g, a fine particles-coated amine is not sufficiently activated at the comparatively low cure temperature, for example, 100° C., and the high activity as a hardener is not obtained. In the invention, the second absorption peak heat amount is a value measured by the measuring method of the second absorption peak heat amount described in the following Example, unless otherwise indicated.

Any aromatic amine and aliphatic amine may be used as a solid amine if the melting point thereof is equal to or higher than 50° C. The examples of the aromatic amine and aliphatic amine include aromatic amines such as 4,4'-diaminodiphenylmethane, 2,4'-diaminodiphenylmethane, 3,3'-diaminodiphenylmethane, 3,4'-diaminodiphenylmethane, 2,2'-diamino biphenyl, 2,4'-diamino biphenyl, 3,3'-diaminobiphenyl, 2,4-diaminophenol, 2,5-diaminophenols, o-phenylenediamine, m-phenylenediamine, 2,3-tolylenediamine, 2,4-tolylenediamine, 2,5-tolylenediamine, 2,6-tolylenediamine and 3,4-tolylenediamine, and aliphatic amines such as 1,12-dodecanediamine, 1,10-decanediamine, 1,8-octanediamine, 1,14-tetradecanediamine, 1,16-hexadecane diamine. They may be used alone or in combination of two or more kinds.

The mean particle size of a solid amine is equal to or smaller than 20 µm. The lower limit of the mean particle size is preferably equal to or greater than 1 µm, more preferably equal to or greater than 1.5 µm, further preferably equal to or greater than 2 µm, particularly preferably equal to or greater than 3 µm. The upper limit of the mean particle size is preferably equal to or smaller than 15 µm, more preferably equal to or smaller than 12 µm, further preferably equal to or smaller than 10 µm, particularly preferably equal to or smaller than 8 µm, in particular equal to or smaller than 6 µm. The range of mean particle size may be a combination of those upper limit and lower limit, for example, from 1 µm to 15 µm, preferably from 1 µm to 12 µm, more preferably, from 1.5 µm to 10 µm, further preferably from 2 µm to 8 µm, particularly preferably from 3 µm to 6 µm. When a fine particles-coated amine having a mean particle size greater than 20 µm is used in a one pack curable composition, there is a tendency that the one pack curable composition is imperfectly hardened upon the heat hardening. In addition, such a fine particles-coated amine may be settled out in a formulation. Thus, there is a possibility that the amount of discharge in application is not stabilized. In the invention, the mean particle size refers to the particle size which is obtained by using a drying unit of a laser diffraction/scattering particle size distribution measuring apparatus and in which the passing portion cumulative distribution is 50%. In the invention, the mean particle size of a solid amine is a value measured by the measuring method of the mean particle size described in the following Example, unless otherwise indicated.

As fine particles, inorganic fine particles and organic fine particles may be used. The examples of the inorganic fine particles include titanium oxide, calcium carbonate, clay, silica, zirconia, carbon, alumina, talc, etc. The examples of the organic fine particles include polyvinyl chloride, a polyacrylic resin, polystyrene, polyethylene, a urea resin, etc. They may be used alone or in combination of two or more kinds.

The mean particle size of fine particles is equal to or smaller than 2 µm, preferably equal to or smaller than 1 µm, more preferably equal to or smaller than 0.5 µm, further preferably equal to or smaller than 0.1 µm, in particular equal to or smaller than 0.05 µm. The lower limit of the mean particle size of fine particles is not particularly limited but, for example, equal to or greater than 0.001 µm. When the mean particle size of fine particles is greater than 2 µm, it may become difficult for the fine particle to adhere to the surface of a solid amine. In the invention, the mean particle size of fine particles is a value measured by the measuring method of the mean particle size described in the following Example, unless otherwise indicated.

The weight ratio of a solid amine to fine particles (solid amine/fine particles) is preferably from 1/0.001 to 1/0.5, more preferably from 1/0.01 to 1/0.5. When the weight ratio of a solid amine to fine particles is in the above-mentioned range, the storage stability may efficiently be acquired.

The fine particles-coated amine of the invention may be obtained by a production process including the steps of:
1) pulverizing a solid amine having a melting point equal to or higher than 50° C. to particles of the solid amine having a mean particle size equal to or smaller than 20 µm by using a pulverizer; and
2) mixing the particles of the solid amine obtained in step 1) and fine particles having a mean particle size equal to or smaller than 2 µm with each other using a mixing stirrer to coat the surface of each of the particles of the solid amine with the fine particles, wherein steps 1) and 2) are conducted in an atmosphere at a temperature equal to or lower than 30° C. and/or having a relative humidity equal to or lower than 70%.

According to the production process, steps 1) and 2) are conducted in an atmosphere, at a temperature equal to or lower than 30° C., preferably, equal to or lower than 25° C., and, more preferably, equal to or lower than 20° C. and/or having relative humidity equal to or lower than 70%, preferably, equal to or lower than 65%, and, more preferably, equal to or lower than 55%. Any carbonation of the reactive amino group may thereby be suppressed and the surface of each of the particles of the solid amine may be coated with the fine particles without deactivating any amino group present on the surface of the particle of the solid amine. Even when the solid amine is pulverized to relatively small particles, a fine particles-coated amine having sufficient activity may be obtained.

A high speed impact mixing pulverizer such as, for example, a jet mill, a hammer mill, or the like may be used as a pulverizer. Above all, preferably, the jet mill may be used because the adjustment of the particle size is easy, a sharp particle size distribution may be obtained, and any contamination such as metal powder may be suppressed, and, especially preferably, a counter jet mill which pulverizes a raw material by causing the raw material pieces to collide with each other using compressed gas flows which face each other may be used. When the counter jet mill is used, the air pressure (0.4 to 0.8 MPa), the number of rotations for classification (3,000 to 12,000 rpm), and the crushing time period may properly be adjusted corresponding to the throughput, the desired particle size, and the like. A form of using an inert gas such as a nitrogen gas instead of the compressed air is also preferable.

The pulverized solid amine particles are mixed with the fine particles using the mixing stirrer. Static electricity is thereby generated and the fine particles may thereby be bonded to the surfaces of the solid amine particles. Or, the fine particles may be bonded thereto due to a local fusion-bonding phenomenon of the solid amine particles caused by heat generation caused by friction, impacts, compression shear, and the like generated by the mechanical force of the mixing stirrer. Alternatively, the fine particles may each be bonded to the surface of the solid amine particle by being physically anchored thereto or buried therein, or the fine particles may be bonded thereto by being chemically activated. As above, the reactive amino group ($NH_2$) on the surface of the solid amine particle is coated by the fine particles.

For example, a Henschel mixer, a hybridizer, or a jet mill may be used as the mixing stirrer. Above all, preferably, the Henschel mixer may be used because the fine particles may strongly be buried into the surface of the solid amine particle and the fine particles may thereby be caused to be more difficult to be peeled off. When the Henschel mixer is used, such items may be adjusted corresponding to the throughput and the desired particle size, as the mixing time period (1 to 30 minutes), the type of the blades (for example, a combination of upper blades: Y special 4 and lower blades: SO, or the like), and the rotation velocity (10 to 100 m/sec). The pulverized solid amine particles and the fine particles may also be mixed with each other in the Henschel mixer filled with an inert gas such as a nitrogen gas.

The fine particles may be put into a pulverizer simultaneously with the solid amine and/or put into a mixing stirrer after step 1). When the jet mill is used as a substitute of the mixing stirrer, the fine particles-coated amine may be produced by adding the fine particles after the solid amine is pulverized and/or by adding the fine particles simultaneously with the solid amine to conduct the pulverizing and mixing process therefor.

In this manner, a fine particles-coated amine which contains a solid amine having a melting point equal to or higher than 50° C. and a mean particle size equal to or smaller than 20 μm and having the surface coated with fine particles having a mean particle size equal to or smaller than 2 μm and has an amount of heat in the second absorption peak measured by a differential scanning calorimeter equal to or less than 220 J/g may be obtained.

The fine particles-coated amine of the invention may be activated at a temperature of 50° C. to 150° C. and, preferably, 60° C. to 120° C.

The one-pack type heat curable composition of the invention contains the fine particles-coated amine.

The one-pack type heat curable composition of the invention contains at least one selected from the group consisting of an isocyanate component, a hydrolizable silyl group-containing component, an epoxy resin component, and a mixture thereof, in addition to the fine-particles coated amine.

Examples of the isocyanate component include, for example, a polyisocyanate compound, a terminal-activated isocyanate group-containing urethane prepolymer, and a mixture thereof.

Examples of the polyisocyanate compound include an aromatic polyisocyanate, an aliphatic polyisocyanate, and an alicyclic polyisocyanate. Examples of them include tolylenediisocyanate (TDI), diphenylmethanediisocyanate (MDI), crude MDI, 3,3'-dimethyl-4,4'-biphenylenediisocyanate, 1,4-phenylenediisocyanate, p-toluenesulfonylisocyanate, n-octadecylisocyanate, xylylenediisocyanate, tetramethylxylylenediisocyanate, naphthylenediisocyanate, dicyclohexylmethane-4,4'-diisocyanate, crude TDI, polymethylene.polyphenylisocyanate, isophoronediisocyanate, hexamethylenediisocyanate, hydrogenated xylylenediisocyanate and an isocyanurate, carbodiimidized and biuret-modified compound thereof. Each of the above alone or a mixture of two or more of the above may be used.

The terminal-activated isocyanate group (NCO)-containing urethane prepolymer (hereinafter, also referred to as "terminal NCO prepolymer") may be produced by reacting an ordinary polyol component with an excessive amount of the polyisocyanate compound such that the equivalent ratio of OH/NCO is 1/1.2 to 3.5. The above polyisocyanate compound may be used as the polyisocyanate compound. The reaction may usually take place under the condition of a temperature of the normal temperature or 60 to 90° C. and for a time period of 1 to 7 hours in the presence of, when necessary, a proper reaction solvent (for example, ethyl acetate, toluene, or xylene) and a reaction catalyst (for example, an organic tin-based catalyst such as dibutyltin dilaurate, a bismuth-based catalyst such as bismuth octylate, or a tertiary amine-based catalyst such as 1,4-diaza[2,2,2]bicyclooctane). The resulted terminal NCO-containing prepolymer may usually has a terminal NCO content of 0.5 to 5% (% by weight and the same will be applied hereinafter) and a viscosity of 5,000 to 500,000 Pa·s at 20° C.

Examples of the polyol component include, for example, a polyether polyol formed by addition-polymerizing a propylene oxide, or a propylene oxide and an alkylene oxide such as an ethylene oxide, to a polyhydric alcohol such as water, ethylene glycol, propylene glycol, glycerin, trimethylolpropane, pentaerythritol, sorbitol, or sucrose; ethylene glycol, propylene glycol and an oligo glycol thereof; butylene glycol, hexylene glycol, a polytetramethyleneether glycol; a polycaprolactone polyol; a polycarbonate polyol; a polyester polyol such as polyethylene adipate; a polybutadiene polyol; a higher fatty acid ester having a hydroxyl group such as castor oil; and a polymer polyol formed by grafting a vinyl monomer to a polyester polyol or a polyester polyol. Those skilled in the art may properly select any of above substances to be used as the polyol component, corresponding to the purpose of use of and the use conditions for the one-pack type heat curable composition.

When the one-pack type heat curable composition of the invention is constituted by a system having the isocyanate component and the fine particles-coated amine blended therein, as necessary, an epoxy resin having two or more functional groups may be added in a proper amount as an additional component to impart physical properties of the hardened material such as, especially, robust durability against the compression strain and the like.

Examples of the epoxy resin include bisphenol-A, that of an F type, that of an AD type, that of a phenol type, that of a cresol type, that based on an alicyclic substance, that based on a glycidyl ester, and that based on a glycidyl amine, and, especially preferably, the one in a liquid form may be used. Because of the addition of the epoxy resin, during the heat hardening, a reaction between the epoxy resin and the solid amine takes place in addition to a reaction between the isocyanate component and the solid amine, and a reticular structure is established based on this three-dimensionalizing reaction. A hardened material having the robust durable physical property may therefore be formed.

The epoxy resin may be used in an amount in a range of 1 to 15 part(s) by weight relative to 100 parts by weight of the isocyanate component. When the epoxy resin is used in an amount in the above range, the physical properties of the epoxy resin may be caused to achieve without degrading any of the rubber physical properties of the polyurethane hardened material. When the physical properties of the epoxy resin are desired, the epoxy resin may be used in an epoxy resin-rich form or used alone.

The blending ratios of the isocyanate component and the fine particles-coated amine may be set such that the equivalent weight ratio of the NCO to $NH_2$ after the activation by heating is, preferably, 0.9 to 1.3, is, more preferably, 0.95 to 1.2, and is, further preferably, 1.0 to 1.1.

Examples of the hydrolizable silyl group-containing component include, for example, a modified silicone polymer, an acrylic polymer having an alkoxysilyl group, a polyisobutylene polymer having an alkoxysilyl group, and a mixture thereof.

The above-mentioned modified silicone polymer refers to a liquid polymer having a polyoxyalkylene ether as a main chain and containing a silyl group with a hydrolyzable group such as a hydrogen atom, a halogen atom, an alkoxy group, an acyloxy group, a ketoxymate group, an amino group, an amide group, an acid amide group, an aminooxy group, a mercapto group and an alkenyloxy group at the terminal or in a side chain. Among them, a modified silicone polymer having a polyalkylene ether such as a polyoxypropylene ether as a main chain and a number-average molecular weight (Mn) of 9,000 to 25,000 is preferred.

The modified silicone polymer is typically commercially available, for example, as MS polymer "MS polymer S-203" from Kaneka Corporation or "EXCESTAR®" from Asahi Glass Co., Ltd.

The above-mentioned acrylic polymer having an alkoxysilyl group refers to a polymer having a main chain composed of at least (meth)acrylic acid ester unit (if necessary, the main chain may contain a unit of a monomer copolymerizable with a (meth)acrylic acid ester unit such as C4-12 olefines, vinyl ethers, an aromatic vinyl compound, vinylsilanes and allylsilanes other than a (meth)acrylic acid ester unit) and containing an alkoxysilyl group in a molecule. The examples of the acrylic polymer having an alkoxysilyl group used in the invention are as follows.

(i) A polymer having a number-average molecular weight (Mn) of 3,000 to 100,000 and having on average 1.5 to 3 of alkoxysilyl groups in a molecule, as disclosed in JP-B-3-80829. The polymer may be produced by radical copolymerizing (a) an acrylic acid alkyl ester (preferably, C2-4 alkyl) such as ethyl acrylate, a propyl acrylate, n-butyl acrylate, isobutyl acrylate, amyl acrylate, hexyl acrylate, 2-ethyl hexyl acrylate, cyclohexyl acrylate and n-octyl acrylate with (b) one kind selected from the group of a vinyl alkoxy silane such as vinyl trimethoxy silane, vinyl methyl dimethoxy silane, vinyl triethoxy silane and vinyl dimethyl methoxysilane and a (meta)acryloxy alkoxy silane such as Y-methacryloxypropyl trimethoxy silane and Y-methacryloxypropyl methyl dimethoxy silane or a mixture of two or more kinds thereof in the presence of (c) a mercaptoalkoxy silane such as Y-mercaptopropyl methyl dimethoxy silane and Y-mercaptopropyl trimethoxy silane as a chain transfer agent (generally, by a publicly known process such as a bulk polymerization and a solution polymerization using a polymerization initiator such as α,α'-azobis isobutyronitrile (AIBN), α,α'-azobisiso valeronitrile, benzoyl peroxide, methyl ethyl ketone peroxide or a redox polymerization process in which a redox catalyst such as a transition metal salt and an amine is combined with a peroxide-based initiator).

(ii) A polymer disclosed in JP-B-4-69667. The polymer may be produced by adding 0.05 to 50 parts by weight of an alkoxysilyl group-containing disulfide compound such as bis(trimethoxysilylmethyl)disulfide, bis(triethoxysilyl methyl)disulfide, bis(trimethoxysilylpropyl)disulfide, bis(triethoxysilylpropyl)disulfide, bis(methyldimethoxysilylmethyl)disulfide, bis(methyldiethoxysilylmethyl)disulfide, bis(propyldimethoxysilylmethyl)disulfide, bis(propyldiethoxysilylmethyl)disulfide, bis(dimethylmethoxysilylpropyl)disulfide, and bis(dimethylethoxysilylpropyl)disulfide to 100 parts by weight of a vinyl monomer, for example, an acrylate such as ethyl acrylate, butyl acrylate, 2-ethylhexyl acrylate, propyl acrylate, pentyl acrylate and stearyl acrylate; a methacrylate such as methyl methacrylate, ethyl methacrylate, butyl methacrylate, 2-ethylhexyl methacrylate, lauryl methacrylate, benzyl methacrylate and cyclohexyl methacrylate; styrene or a derivative thereof such as α-methyl styrene and chloromethyl styrene; a fumaric acid diester such as diethyl fumarate, dibutyl fumarate and dipropyl fumarate; a vinyl halide such as vinyl chloride, vinylidene chloride, ethylene fluoride, vinylidene fluoride and fluorinated vinylene, and carrying out photopolymerization (on exposure to light at normal temperature (23° C.) or 50 to 60° C. for 4 to 30 hours), if necessary, in an organic solvent such as toluene, xylene, hexane, ethyl acetate and dioctylphthalate.

The above-mentioned polyisobutylene-based polymer having an alkoxysilyl group refers to a polymer having a main chain composed of at least an isobutylene unit (if necessary, the main chain may contain a unit of a monomer copolymerizable with isobutylene such as C4-12 olefins, vinyl ether, an aromatic vinyl compound, vinylsilanes and allylsilanes, in addition to the isobutylene unit) and containing an alkoxysilyl group at both terminals of a molecule. The polyisobutylene-based polymer having an alkoxysilyl group usually has a number-average molecular weight (Mn) of 1,000 to 40,000 and is wax-like or high viscous liquid at normal temperature. In addition, the polyisobutylene-based polymer having an alkoxysilyl group may be generally produced by using an isobutylene-based polymer having a functional group at all terminals obtained by cationic polymerization called as Inifer process (see, JP-A-8-231758). Such a polyisobutylene-based polymer having an alkoxysilyl group is typically commercially available as "Epion®" series from Kaneka Corporation, which has a chemical structure:

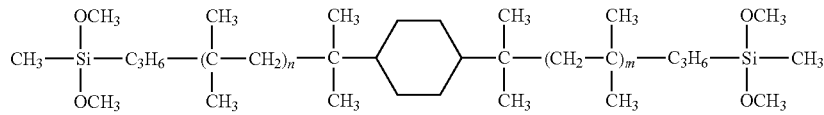

[wherein, n is from 5 to 400 and m is from 5 to 400.]

When a modified silicone polymer and/or an acrylic polymer are used as a hydrolysable silyl group-containing polymer, a curable composition which has a good weather resistance may be obtained and the physical property of a curable composition may be adjusted to low modulus and high elongation. When an acrylic modified silicone polymer which is commercially available as an alkoxysilyl group-containing acrylic polymer obtained by the polymerization in a modified silicone polymer (for example, which is commercially available as "MS Polymer S-943" etc. from Kaneka Corporation) is used, good compatibility with each component in a one-pack type heat curable composition may be obtained, the weather resistance may be improved by the interaction with a modified silicone polymer or by the cross-linking due to the hydrolysis, and the physical property of a curable composition after curing may be adjusted to low modulus and high elongation In the invention, a non-solvent type acrylic polymer having no functional group and liquid at normal temperature, which is obtained by continuous mass polymerization at high temperature and high pressure, may be compounded with a hydrolysable silyl group-containing polymer into the curable composition of the invention. Such non-solvent type acrylic polymer which has no functional group and is liquid at normal temperature may be used to adjust the physical property of a curable composition to low modulus and high elongation. The above-mentioned non-solvent type acrylic polymer having no functional group and liquid at normal temperature may be produced, using an acrylic monomer having no functional group (for example, such an acrylate and a methacrylate as those used in polymerization of an alkoxysilyl group-containing acrylic polymer (ii)), for example, by continuous mass polymerization with a very small amount of or no initiator and with no chain transfer agent at high temperature of around 400° C. and high pressure for a very short reaction time, for example, about 5 minutes. The above-mentioned non-solvent type acrylic polymer which has no functional group and is liquid at normal temperature has a narrow composition distribution and a narrow molecular-weight distribution, and thus, may exhibit 100% polymer, low Tg and liquid form at normal temperature and have good compatibility with a modified silicone polymer. When the above-mentioned non-solvent type acrylic polymer having no functional group and liquid at normal temperature is used, viscosity and stickiness of the curable composition may be adjusted, good workability may be obtained and weather resistance may be further improved. The above-mentioned non-solvent type acrylic polymer having no functional group and liquid at normal temperature is commercially available, for example, as "ARUFON® UP-1000" from TOAGOSEI corporation.

In the invention, the above-mentioned acrylic polymer may be a mixture of an alkoxysilyl group-containing acrylic polymer polymerized in a modified silicone polymer and a non-solvent type acrylic polymer having no functional group and liquid at normal temperature obtained by continuous mass polymerization at high temperature and high pressure. When a non-solvent type acrylic polymer which has no functional group and is liquid at normal temperature is used, the effect of substituting plasticizer may be obtained, the physical property of a composition after curing may be adjusted to low modulus and high elongation, and the workability and weather resistance of a curable composition may be improved.

The amount to be blended may be selected in a range for the fine particles-coated amine to be 0.1 to 20 parts by weight relative to 100 parts by weight of the hydrolysable silyl group-including polymer, is, preferably, 1 to 15 parts by weight, and is, more preferably, 2 to 12 parts by weight. When the amount of the fine particles-coated amine is equal to or less than 0.1 parts by weight, the hardening by heating may be unable to be completed in a short time period. When the amount of the fine particles-coated amine exceeds 20 parts by weight, no economical effect may be achieved.

The epoxy resin component that itself is known may be used in the one-pack type heat curable composition. Examples of the epoxy resin component include those of a glycidyl ether type obtained by a reaction between a polyhydric phenol such as bisphenol-A, bisphenol-F, bisphenol-S, hexahidrobisphenol-A, tetramethylbisphenol-A, pyrocatechol, resorcinol, cresolnovolac, tetrabromobisphenol-A, trihydroxybiphenyl, bisresorcinol, bisphenolhexafluoroacetone, tetramethylbisphenol-F, or bixylenol, and epichlorohydrin; those of a polyglycidyl ether type obtained by a reaction between an aliphatic polyhydric alcohol such as glycerin, neopentylglycol, ethyleneglycol, propyleneglycol, butyleneglycol, hexyleneglycol, polyethyleneglycol, or polypropyleneglycol, and epichlorohydrin; those of a glycidylether ester type obtained by a reaction between a hydroxycarboxylic acid such as p-oxybenzoic acid or β-oxynaphthoic acid, and epichlorohydrin; those of a polyglycidyl ester type derived from a polycarboxylic acid such as phthalic acid, methylphthalic acid, isophthalic acid, terephthalic acid, tetrahydrophthalic acid, hexahydrophthalic acid, endomethylenetetrahydrophthalic acid, endomethylenehexahydrophthalic acid, trimellitic acid, or a polymerized fatty acid; those of a glycidylaminoglycidyl ether type derived from aminophenol, aminoalkylphenol, or the like; those of a glycidylaminoglycidyl ester type derived from an aminobenzoic acid; those of a glycidylamine type derived from aniline, toluidine, tribromoaniline, xylylenediamine, diaminocyclohexane, bisaminomethylcyclohexane, 4,4'-diaminodiphenylmethane, 4,4'-diaminodiphenylsulfone, or the like; epoxidized polyolefin, glycidylhydantoin, glycidylalkylhydantoin, triglycidyl cyanurate, or the like; monoepoxy compounds such as butylglycidyl ether, phenylglicidyl ether, alkylphenylglicidyl ether, gulycidylbezoate ester, or styrene oxide; or the like. Each of these alone or two or more of these as a mixture may be used.

The one-pack type heat curable composition of the invention may contain, as necessary, ordinary additives such as a curing catalyst, a filling agent, a solvent, and a plasticizer in a proper amount.

Examples of the curing catalyst include those based on DBU such as DBU [1,8-diazabicyclo(5.4.0)undecene-7], DBU phenoxide, DBU octylicylate, and DBU formate; those based on amine such as a monoamine (such as triethylamine), a diamine (such as N,N,N',N'-tetramethylethylenediamine), a triamine (such as tetramethylguanidine), a cyclic amine (such as triethylenediamine), an alcohol amine (such as dimethylaminomethanol), and an ether amine [such as bis(2-dimethylaminoethyl)ether]; organic metal carboxylates such as those based on Sn (such as dibutyltin dilaurate and tin octylicylate), those based on Pb (such as lead octylicylate), and those based on Zn (such as zinc octylicylate); and those based on imidazole such as 2-methylimidazole and 1,2-dimethylimidazole.

Examples of the filling agent include heavy calcium carbonate, fatty acid treated calcium carbonate, fumed silica, sedimentary silica, carbon black, talc, mica, clay, glass beads, balloons such as shirasu balloons, glass balloons, silica balloons, and plastic balloons, inorganic fibers such as glass fiber and metal fiber, organic fibers such as polyethylene fiber and polypropylene fiber, and needle-like crystalline fillers such as aluminum borate, silicon carbide, silicon nitride, potassium titanate, graphite, needle-like crystalline calcium carbonate, magnesium borate, titanium diboride, chrysotile, and wallastonite.

Examples of the solvent include solvents having weak polarity such as, for example, those based on aliphatic hydrocarbons, those based on aromatic hydrocarbons, those based on alicyclic hydrocarbons, those based on halogenated hydrocarbons, ethers, esters, and ketones. Especially preferably, solvents based on aliphatic hydrocarbons may be used.

Examples of the plasticizer include dibutylphthalate, dioctylphthalate, dicyclohexylphthalate, diisooctylphthalate, diisodecylphthalate, dibenzylphthalate, butylbenzylphthalate, trioctylphosphate, epoxy-based plasticizers, toluene-sulfonamide, chloroparaffin, adipate esters, polypropyleneglycol esters, paraffin-based hydrocarbons, naphthene-based hydrocarbons, and castor oil.

A further additive may be blended in a proper amount. Examples of the further additives include as a thixotropic agent, an ultraviolet absorbing agent, an anti-aging agent, a dye and a pigment, an adherence agent, and a dehydrating agent.

The one-pack type heat curable composition of the invention may be produced by collectively mixing the above components according to a conventionally known method.

The one-pack type heat curable composition of the invention may be cured at a curing temperature of 50° C. to 150° C. and, preferably, at 60° C. to 120° C. for 3 minutes to 30 minutes and, preferably, for 5 minutes to 20 minutes.

The fine particles-coated amine according to the invention may advantageously be used as a curing agent for the one-pack type heat curable composition because the surface of the solid amine particle is coated with the fine particles without any carbonation of the amino group of the solid amine. The one-pack type heat curable composition containing the fine particles-coated amine of the invention may sufficiently be cured even when the curing temperature is low or even when the mean particle size of the solid amine particles of the fine particles-coated amine is small, and may therefore advantageously be used for an adhesive, a sealing material, a coating material, an under-fill material, and the like.

The present invention will be described in more detail with reference to Examples and Comparative Examples while the present invention is not at all limited by Examples and Comparative Examples.

EXAMPLES

[Second Absorption Peak Heat Amount]

The second absorption peak heat amount was measured by using a differential scanning calorimeter (DSC). As the DSC, model Q2000 DSC manufactured by TA Instruments Japan Inc. was used. According to the temperature program, the temperature was increased from the room temperature to 200° C. at a rate of 5° C./min and the measurement of the second absorption peak was conducted during the increase of the temperature.

[Mean Particle Size]

To measure the particle size and the particle size distribution of the solid amine particles and the fine particles, a laser diffraction-scattering particle size distribution measuring apparatus LA-950V2 manufactured by Horiba Ltd., was used and the measurement was conducted according to a dry method. The particle size with which the resulting passing substance cumulative distribution was 50% was taken as the mean particle size.

[Breaking Strength]

The compositions under test were applied with a thickness of 2 mm onto a release coated paper sheet, and were heated at 100° C. for 10 minutes to be cured. The breaking strength thereof was thereafter obtained according to JIS K 6251 "Vulcanized Rubber and Thermoplastic Rubber-How to Acquire Value of Tensile Property" and the measurement result was judged according to the following criteria.
  ○: Breaking strength equal to or higher than 2 MPa
  x: Breaking strength lower than 2 MPa

[Tackiness]

The compositions under test were each applied with a thickness of 2 mm onto a release coated paper sheet, and were each heated at 100° C. for 10 minutes to be cured. The state of the surface of each hardened material was checked by digital examination and was evaluated according to the following criteria.
  ○: No component of the hardened material adhered to the finger.
  x: A component of the hardened material adhered to the finger.

[Reactive Property]

To evaluate the hardenability of the one-pack type heat curable composition, presence or absence of an absorption peak (2,260 $cm^{-1}$) of the isocyanate group remaining in the one-pack type heat curable composition after the curing was checked using an FT-IR (Nicolet iS10 manufactured by Thermo Fisher Scientific K.K.).

Example 1 (Production of Fine Particles-Coated Amine According to Present Invention)

A solid amine (76.9 g of 1,12-dodecanediamine whose melting point was 71° C.) and 23.1 g of titanium oxide fine particles having a mean particle size of about 0.02 μm were put in a jet mill in an atmosphere whose temperature was 29° C. and whose relative humidity was 69% to conduct pulverizing and coating for the content. The solid amine was pulverized to particles having a mean particle size of 13 μm. A fine particles-coated amine having a second absorption peak heat amount of 71 J/g was obtained.

Example 2 (Production of Fine Particles-Coated Amine According to Present Invention)

A solid amine (76.9 g of 1,12-dodecanediamine whose melting point was 71° C.) and 23.1 g of titanium oxide fine particles having a mean particle size of about 0.02 μm were put in a jet mill in an atmosphere whose temperature was 28° C. and whose relative humidity was 65% to conduct pulverizing and coating for the content. The solid amine was pulverized to particles having a mean particle size of 8 μm. A fine particles-coated amine having a second absorption peak heat amount of 120 J/g was acquired.

Example 3 (Production of Fine Particles-Coated Amine According to Present Invention)

76.9 g of a solid amine (1,12-dodecanediamine whose melting point was 71° C.) was put in a jet mill (a counter jet mill manufactured by Hosokawa Micron Corporation) in an atmosphere whose temperature was 28° C. and whose relative humidity was 68% to be pulverized to particles having a mean particle size of 4 μm. The pulverized solid amine particles and 23.1 g of titanium oxide fine particles having a mean particle size of about 0.02 μm were put in a Henschel mixer (a model FM20 manufactured by Nippon Coke Co., Ltd.). After mixing the components with each other for 5 minutes, a fine particles-coated amine was obtained. The second absorption peak heat amount of the obtained fine particles-coated amine was 187 J/g.

Example 4 (Production of Fine Particles-Coated Amine According to Present Invention)

A solid amine (76.9 g of 1,12-dodecanediamine whose melting point was 71° C.) and 23.1 g of titanium oxide fine particles having a mean particle size of about 0.02 μm were put in a jet mill in an atmosphere whose temperature was 23° C. and whose relative humidity was 63% to conduct pulverizing and coating for the content. The solid amine was pulverized to particles having a mean particle size of 5 μm. A fine particles-coated amine having a second absorption peak heat amount of 120 J/g was acquired.

Example 5 (Production of Fine Particles-Coated Amine According to Present Invention)

A solid amine (76.9 g of 1,12-dodecanediamine whose melting point was 71° C.) and 23.1 g of titanium oxide fine particles having a mean particle size of about 0.02 μm were put in a jet mill in an atmosphere whose temperature was 25° C. and whose relative humidity was 63% to conduct pulverizing and coating for the content. The solid amine was pulverized to particles having a mean particle size of 15 μm. A fine particles-coated amine having a second absorption peak heat amount of 37 J/g was obtained.

Example 6 (Production of Fine Particles-Coated Amine According to Present Invention)

A solid amine (76.9 g of 1,12-dodecanediamine whose melting point was 71° C.) and 23.1 g of titanium oxide fine particles having a mean particle size of about 0.02 μm were put in a jet mill in an atmosphere whose temperature was 15° C. and whose relative humidity was 52% to conduct pulverizing and coating for the content. The solid amine was pulverized to particles having the mean particle size of 4 μm. A fine particles-coated amine whose second absorption peak heat amount was 63 J/g was obtained.

Example 7 (Production of Fine Particles-Coated Amine According to Present Invention)

A solid amine (76.9 g of 1,12-dodecanediamine whose melting point was 71° C.) and 23.1 g of titanium oxide fine particles having a mean particle size of about 0.02 μm were put in a jet mill in an atmosphere whose temperature was 28° C. and whose relative humidity was 72% to conduct pulverizing and coating for the content. The solid amine was pulverized to particles having the mean particle size of 10 μm. A fine particles-coated amine having a second absorption peak heat amount of 209 J/g was obtained.

Comparative Example 1 (Production of Fine Particles-Coated Amine not According to Present Invention)

76.9 g of a solid amine (1,12-dodecanediamine whose melting point was 71° C.) and 23.1 g of titanium oxide fine particles having a mean particle size of about 0.02 μm were put in a jet mill in an atmosphere whose temperature was 35° C. and whose relative humidity was 85% to conduct pulverizing and coating for the content. The solid amine was pulverized to particles having the mean particle size of 15 μm. A fine particles-coated amine having a second absorption peak heat amount of 263 J/g was obtained.

Comparative Example 2 (Production of Fine Particles-Coated Amine not According to Present Invention)

76.9 g of a solid amine (1,12-dodecanediamine whose melting point was 71° C.) was put in a jet mill (a counter jet mill manufactured by Hosokawa Micron Corporation) in an atmosphere whose temperature was 32° C. and whose relative humidity was 73% to be pulverized to particles having a mean particle size of 5 μm. The pulverized solid amine particles and 23.1 g of titanium oxide fine particles having a mean particle size of about 0.02 μm were put in a Henschel mixer (a model FM20 manufactured by Nippon Coke Co., Ltd.) to be mixed with each other for 5 minutes to obtain a fine particles-coated amine. The second absorption peak heat amount of the obtained fine particles-coated amine was 374 J/g.

Comparative Example 3 (Production of Fine Particles-Coated Amine not According to Present Invention)

A solid amine (76.9 g of 1,12-dodecanediamine whose melting point was 71° C.) and 23.1 g of titanium oxide fine particles having the mean particle size of about 0.02 μm were put in a jet mill in an atmosphere whose temperature was 31° C. and whose relative humidity was 71% to conduct pulverizing and coating for the content. The solid amine was pulverized to particles having a mean particle size of 4 μm. A fine particles-coated amine having a second absorption peak heat amount of 275 J/g was obtained.

Examples 8 to 14 (Production of One-Pack Type Heat Curable Composition According to Present Invention) and Comparative Examples 4 to 6 (Production of One-Pack Type Heat Curable Composition not According to Present Invention)

The components having each of the compositions shown in Table 1 below were mixed and dispersed at the room temperature using a mixing stirrer to obtain a one-pack type heat curable composition. The obtained one-pack type heat curable composition was cured at 100° C. for 10 minutes. The breaking strength, the tackiness, and the reactive property of the one-pack type heat curable composition after the curing were evaluated according to the above evaluation methods. The result is shown in Table 2.

TABLE 1

|  | Example 8 | Example 9 | Example 10 | Example 11 | Example 12 |
|---|---|---|---|---|---|
| Fine Particles-Coated Amine 1 | 9.1 | | | | |
| Fine Particles-Coated Amine 2 | | 9.1 | | | |
| Fine Particles-Coated Amine 3 | | | 9.1 | | |
| Fine Particles-Coated Amine 4 | | | | 9.1 | |

TABLE 1-continued

|  | | | | | |
|---|---|---|---|---|---|
| Fine Particles-Coated Amine 5 | | | | | 9.1 |
| Fine Particles-Coated Amine 6 | | | | | |
| Fine Particles-Coated Amine 7 | | | | | |
| Fine Particles-Coated Amine 8 | | | | | |
| Fine Particles-Coated Amine 9 | | | | | |
| Fine Particles-Coated Amine 10 | | | | | |
| Isocyanate Component | 90.9 | 90.9 | 90.9 | 90.9 | 90.9 |

|  | Example 13 | Example 14 | Comparative Example 4 | Comparative Example 5 | Comparative Example 6 |
|---|---|---|---|---|---|
| Fine Particles-Coated Amine 1 | | | | | |
| Fine Particles-Coated Amine 2 | | | | | |
| Fine Particles-Coated Amine 3 | | | | | |
| Fine Particles-Coated Amine 4 | | | | | |
| Fine Particles-Coated Amine 5 | | | | | |
| Fine Particles-Coated Amine 6 | 9.1 | | | | |
| Fine Particles-Coated Amine 7 | | 9.1 | | | |
| Fine Particles-Coated Amine 8 | | | 9.1 | | |
| Fine Particles-Coated Amine 9 | | | | 9.1 | |
| Fine Particles-Coated Amine 10 | | | | | 9.1 |
| Isocyanate Component | 90.9 | 90.9 | 90.9 | 90.9 | 90.9 |

Unit: Parts by weight

[Fine Particles-Coated Amines 1 to 7]

The fine particles-coated amines 1 to 7 were the fine particles-coated amines respectively obtained in Examples 1 to 7.

[Fine Particles-Coated Amines 8 to 10]

The fine particles-coated amines 8 to 10 were the fine particles-coated amines respectively obtained in Comparative Examples 1 to 3.

[Isocyanate Component]

A terminal NCO prepolymer having a terminal NCO content rate of 3.5% and a viscosity of 20,000 mPa·s at 20° C. The terminal NCO prepolymer was obtained by reacting 79.3 g of polyether polyol having an average molecular weight of 2,000 (Excenol 2020 produced by Asahi Glass Co., Ltd.) and 20.7 g of diphenylmethanediisocyanate with each other at a reaction temperature of 80° C. for 2 hours.

TABLE 2

|  | Example 8 | Example 9 | Example 10 | Example 11 | Example 12 | Example 13 |
|---|---|---|---|---|---|---|
| Mean Particle Size of Solid Amine | 13 | 8 | 4 | 5 | 15 | 4 |
| Second Absorption Peak Heat Amount of Fine Particles-Coated Amine (J/g) | 71 | 120 | 187 | 120 | 37 | 63 |
| Breaking Strength | ○ | ○ | ○ | ○ | ○ | ○ |
| Tackiness | ○ | ○ | ○ | ○ | ○ | ○ |
| Absorption at 2,260 cm$^{-1}$ of FT-IR | None | None | None | None | None | None |

|  | Example 14 | Comparative Example 4 | Comparative Example 5 | Comparative Example 6 |
|---|---|---|---|---|
| Mean Particle Size of Solid Amine | 10 | 15 | 5 | 4 |

TABLE 2-continued

| | | | | |
|---|---|---|---|---|
| Second Absorption Peak Heat Amount of Fine Particles-Coated Amine (J/g) | 209 | 263 | 374 | 275 |
| Breaking Strength | ○ | x | x | x |
| Tackiness | ○ | x | x | x |
| Absorption at 2,260 cm$^{-1}$ of FT-IR | None | Present | Present | Present |

From the result shown in Table 2, as to Examples 8 to 14 each using the fine particles-coated amine of the invention, an excellent breaking strength, excellent tackiness, and an excellent reactive property were obtained after the curing even at a relatively low curing temperature such as 100° C. In contrast, as to Comparative Examples 4 to 6 each using the fine particles-coated amine not according to the present invention, no excellent result was obtained for any one of the breaking strength, the tackiness, and the reactive property after the curing.

The invention claimed is:

1. A fine powder-coated amine comprising a solid amine having a melting point equal to or higher than 50° C. and a mean particle size equal to or smaller than 20 μm, wherein the fine powder-coated amine has an amount of heat in the second absorption peak measured by a differential scanning calorimeter equal to or less than 220 J/g, and the surface of the solid amine is coated with fine particles having a mean particle size equal to or smaller than 2 μm.

2. The fine powder-coated amine according to claim 1, wherein the solid amine is an aromatic or aliphatic amine compound.

3. The fine powder-coated amine according to claim 1, wherein the solid amine has a mean particle size of 1 μm to 20 μm.

4. The fine powder-coated amine according to claim 1, wherein a weight ratio of the solid amine to the fine particles is from 1/0.001 to 1/0.5.

5. The fine powder-coated amine according to claim 1, wherein the fine particles are at least one selected from the group consisting of a polyvinyl chloride, titanium oxide, calcium carbonate, clay, carbon, alumina, talc, zinc oxide and silica.

6. A one-pack heat curable composition comprising the fine powder-coated amine according to claim 1.

7. The one-pack heat curable composition according to claim 6, comprising an isocyanate component.

* * * * *